US012781939B2

(12) United States Patent
Lee et al.

(10) Patent No.: US 12,781,939 B2
(45) Date of Patent: Nov. 3, 2026

(54) LAMP FOR VEHICLE HAVING A MICROLENS ARRAY PART AND A CORRESPONDING PLURALITY OF LIGHT SOURCES

(71) Applicant: HYUNDAI MOBIS CO., LTD., Seoul (KR)

(72) Inventors: Hyun Soo Lee, Yongin-si (KR); Na Ram Jun, Yongin-si (KR); Tae Yang Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/389,341

(22) Filed: Nov. 14, 2025

(65) Prior Publication Data

US 2026/0210516 A1 Jul. 23, 2026

(30) Foreign Application Priority Data

Jan. 20, 2025 (KR) ........................ 10-2025-0008241
Jan. 20, 2025 (KR) ........................ 10-2025-0008242

(51) Int. Cl.

*F21S 41/663* (2018.01)
*F21S 41/265* (2018.01)
*F21Y 105/10* (2016.01)
*F21Y 115/10* (2016.01)

(52) U.S. Cl.

CPC ........... *F21S 41/663* (2018.01); *F21S 41/265* (2018.01); *F21Y 2105/10* (2016.08); *F21Y 2115/10* (2016.08)

(58) Field of Classification Search

CPC ...... F21S 41/151; F21S 41/153; F21S 41/265; F21S 41/663; F21V 5/004; F21V 5/007; F21Y 2115/10; F21Y 2105/10
See application file for complete search history.

(56) References Cited

U.S. PATENT DOCUMENTS

| | | | | |
|---|---|---|---|---|
| 10,378,714 | B2 * | 8/2019 | Kim | F21S 41/20 |
| 11,060,680 | B2 * | 7/2021 | Niu | B60Q 1/5035 |
| 11,441,752 | B2 * | 9/2022 | Lim | F21S 41/143 |

* cited by examiner

*Primary Examiner* — Robert J May
(74) *Attorney, Agent, or Firm* — NSIP Law

(57) ABSTRACT

A lamp for a vehicle is provided. The lamp includes light sources, and a micro-lens array part including unit lenses provided forward of the light sources and having a concave-convex shape. The micro-lens array part includes an emergent lens array defining an emergent surface of the micro-lens array part and including the unit lenses, and an array body provided rearward of the emergent lens array. The emergent lens array is fixed to the array body, and a rear surface of the array body is provided to directly face the light sources.

14 Claims, 11 Drawing Sheets

LAMP FOR VEHICLE HAVING A MICROLENS ARRAY PART AND A CORRESPONDING PLURALITY OF LIGHT SOURCES

CROSS-REFERENCE TO RELATED APPLICATION

This application claims priority to and the benefit under 35 USC § 119(a) of Korean Patent Application Nos. 10-2025-0008241 and 10-2025-0008242 filed in the Korean Intellectual Property Office on Jan. 20, 2025, the entire contents of which are incorporated herein by reference for all purposes.

BACKGROUND

1. Field

The present disclosure relates to a lamp for a vehicle.

2. Description of the Related Art

A lamp for a vehicle, to which a micro-lens array is applied, has an advantage in that the lamp forms a uniform lighting image regardless of an angle viewed from the outside. However, because of the nature of the micro-lens array provided with a plurality of lenses having predetermined curvatures, there is a problem in that the micro-lens array is difficult to manufacture and expensive.

Meanwhile, an intelligent front-lighting system (IFS) lamp, which forms an adaptive light distribution pattern depending on the circumstances in front of a vehicle, operates in such a way as to independently control an operation of turning on or off some of a plurality of light sources. However, in the related art, there is a problem in that a light-emitting surface of the lamp is formed non-uniformly in accordance with a state in which the light sources in the IFS lamp are turned on or off, which degrades an aesthetic appearance of the lamp.

SUMMARY

The present disclosure has been made in an effort to simplify a structure of a micro-lens array, thereby reducing costs and difficulty in manufacturing a lamp to which the micro-lens array is applied.

The present disclosure has also been made in an effort to form a uniform light-emitting surface of a lamp even in case that only some of a plurality of light sources in the lamp are turned on.

In a general aspect, a lamp for a vehicle includes: a plurality of light sources; and a micro-lens array part comprising a plurality of unit lenses provided forward of the plurality of light sources and having a concave-convex shape, wherein the micro-lens array part comprises an emergent lens array configured to define an emergent surface of the micro-lens array part and comprising the plurality of unit lenses, and an array body provided rearward of the emergent lens array, wherein the emergent lens array is configured to be fixed to the array body, and wherein a rear surface of the array body is provided to directly face the plurality of light sources.

The rear surface of the array body may have a planar shape.

The emergent lens array and the array body may be configured as separate components.

The emergent lens array and the array body may be integrated.

Light beams emitted from the plurality of light sources may reach the unit lenses corresponding to the plurality of light sources, wherein a center of a local light distribution pattern, which is formed by light beams that reach some of the plurality of unit lenses and then propagate to the outside when some of the plurality of light sources are turned on, may be physically spaced apart from a center of a local light distribution pattern formed by light beams that reach some of the other unit lenses and then propagate to the outside when some of the other light sources are turned on.

The plurality of light sources and the plurality of unit lenses may correspond to one another in a one-to-one manner, wherein centers of local light distribution patterns, which are formed by light beams that are emitted from the plurality of light sources, reach the unit lenses corresponding to the light sources in a one-to-one manner, and then propagate to the outside, may be physically spaced apart from one another.

An overall light distribution pattern, which is formed by light beams that are emitted from the plurality of light sources, reach the micro-lens array part, and then propagate to the outside, may be defined as an entire light distribution pattern, wherein when the plurality of light sources and the plurality of local light distribution patterns, which are formed by the light beams that are emitted from the plurality of light sources, reach the plurality of unit lenses, and then propagate to the outside, are connected by imaginary line segments, at least some of the plurality of imaginary line segments may intersect one another in a leftward/rightward direction or an upward/downward direction.

A light distribution pattern, which is formed by light beams that reach some of the plurality of unit lenses and then propagate to the outside when some of the plurality of light sources are turned on, is defined as a local light distribution pattern, and the light sources, which emit the light beams for forming the local light distribution pattern among the plurality of light sources, may be disposed to be further dispersed than the local light distribution pattern.

A light distribution pattern, which is formed by light beams that reach some of the plurality of unit lenses and then propagate to the outside when some of the plurality of light sources are turned on, may be defined as a local light distribution pattern, wherein the local light distribution pattern may have a matrix form, wherein some turned-on light sources, which are turned on to form the local light distribution pattern among the plurality of light sources, may be spaced apart from some of the other turned-on light sources in the upward/downward direction and the leftward/rightward direction.

The entire light distribution pattern and the plurality of light sources may be arranged in a matrix form of m×n, wherein m represents the number of rows and n represents the number of columns, and wherein the light sources, which form the local light distribution pattern as a symmetric local light distribution pattern having a symmetric shape with respect to a central axis V of the entire light distribution pattern based on the upward/downward direction in the plurality of light sources, may be arranged according to: i) an up-and-down inversion step of forming an inverted local light distribution pattern by inverting the symmetric local light distribution pattern in the upward/downward direction; ii) a left-and-right dispersion step of forming a first-first dispersed light distribution pattern by fixing some unit lattices, which constitute the inverted local light distribution pattern inverted in the up-and-down inversion step, and moving some of the other unit lattices in the leftward/rightward direction; iii) an up-and-down dispersion step of forming a first-second dispersed light distribution pattern by fixing some of the columns of the first-first dispersed light distribution pattern and inverting some of the other columns in the upward/downward direction; and iv) a light source disposition step of disposing the light sources, which form the symmetric local light distribution pattern, at a position corresponding to the first-second dispersed light distribution pattern.

In the left-and-right dispersion step, the unit lattices, which are adjacent, in the upward/downward direction or the leftward/rightward direction, to the fixed unit lattices among the unit lattices constituting the inverted local light distribution pattern inverted in the up-and-down inversion step, may move in the leftward/rightward direction.

In the left-and-right dispersion step, some of the other unit lattices, which constitute the inverted local light distribution pattern inverted in the up-and-down inversion step, may move in a direction opposite to a direction toward the central axis V based on the upward/downward direction.

The entire light distribution pattern and the plurality of light sources may be arranged in a matrix form of m×n, wherein m represents the number of rows and n represents the number of columns, and wherein the light sources, which form the local light distribution pattern as an asymmetric local light distribution pattern having an asymmetric shape with respect to a central axis V of the entire light distribution pattern based on the upward/downward direction in the plurality of light sources, may be arranged according to: i) an up-and-down and left-and-right inversion step of forming an inverted local light distribution pattern by inverting the asymmetric local light distribution pattern in the upward/downward direction and the leftward/rightward direction; ii) a left-and-right dispersion step of forming a second-first dispersed light distribution pattern by fixing some unit lattices, which constitute the inverted local light distribution pattern inverted in the up-and-down and left-and-right inversion step, and moving some of the other unit lattices in the leftward/rightward direction; iii) an up-and-down dispersion step of forming a second-second dispersed light distribution pattern by fixing some of the columns of the second-first dispersed light distribution pattern and inverting some of the other columns in the upward/downward direction; iv) a step of forming a second-third dispersed light distribution pattern by fixing some unit lattices, which constitute the second-second dispersed light distribution pattern, and moving some of the other unit lattices in the leftward/rightward direction while traversing the central axis V based on the upward/downward direction; and v) a light source disposition step of disposing the light sources, which form the asymmetric local light distribution pattern, at a position corresponding to the second-third dispersed light distribution pattern.

In the left-and-right dispersion step, some of the other unit lattices, which constitute the inverted local light distribution pattern inverted in the up-and-down inversion step, may move in a direction opposite to a direction toward the central axis V based on the upward/downward direction.

According to the present disclosure, the structure of the micro-lens array may be simplified, thereby reducing costs and difficulty in manufacturing the lamp to which the micro-lens array is applied.

In addition, according to the present disclosure, the light-emitting surface of the lamp may be uniformly formed even in case that only some of the plurality of light sources in the lamp are turned on.

DETAILED DESCRIPTION

Hereinafter, a lamp for a vehicle according to the present disclosure will be described with reference to the drawings.

Lamp for Vehicle

Figure 1:
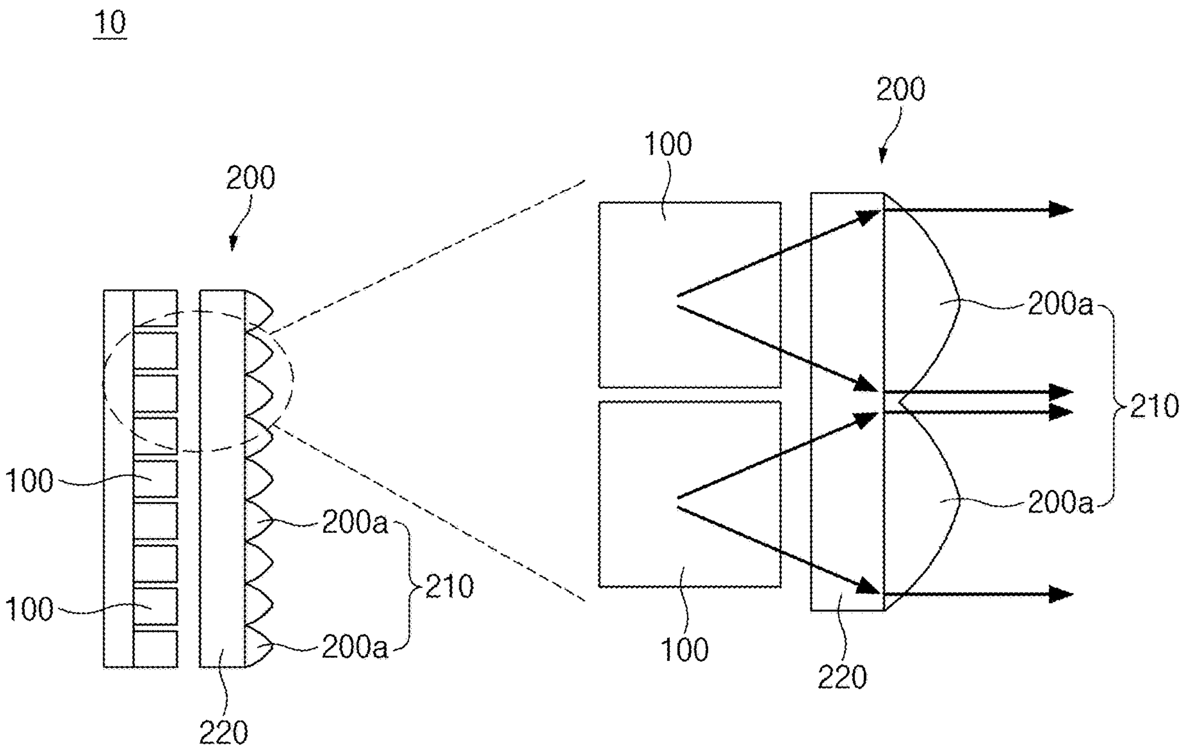
FIG. 1 is a view illustrating a schematic structure of a lamp for a vehicle according to the present disclosure.
Figure 2:
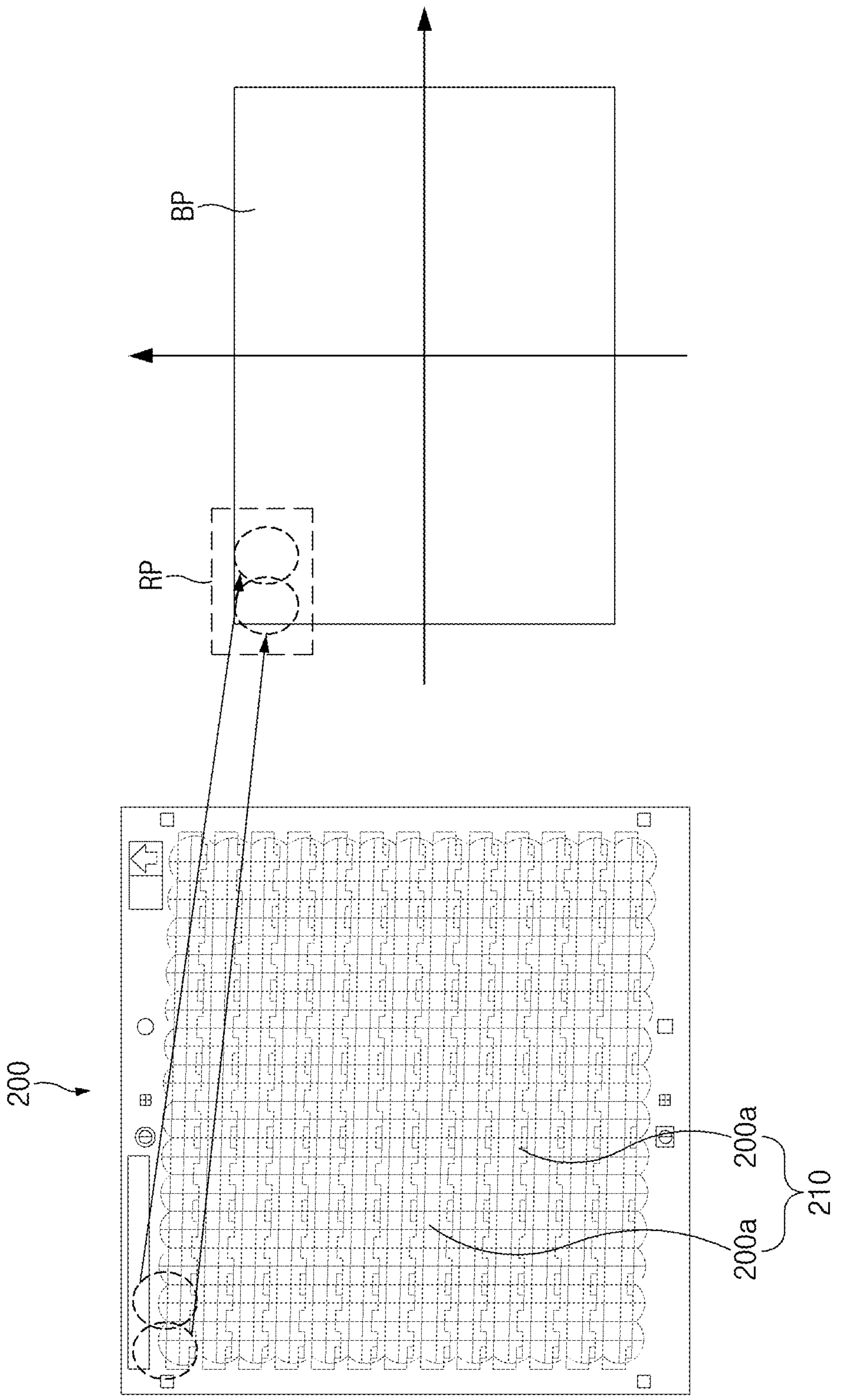
FIG. 2 is a view for explaining a correspondence relationship between a micro-lens array part and a light distribution pattern formed by the lamp for a vehicle according to the present disclosure.

FIG. 1 is a view illustrating a schematic structure of a lamp for a vehicle according to the present disclosure, and FIG. 2 is a view for explaining a correspondence relationship between a micro-lens array part and a light distribution pattern formed by the lamp for a vehicle according to the present disclosure.

With reference to FIGS. 1 and 2, a lamp 10 for a vehicle (hereinafter, referred to as a 'lamp') according to the present disclosure may include a plurality of light sources 100, and a micro-lens array part 200 including a plurality of unit lenses **200*a* provided forward of the plurality of light sources 100 and having a concave-convex shape. According to the present disclosure, the plurality of light sources 100** may each be an LED. More particularly, the plurality of light sources may each be a micro-LED.

Meanwhile, the micro-lens array part 200 may include an emergent lens array 210 configured to define an emergent surface of the micro-lens array part 200 and including the plurality of unit lenses **200*a*, and an array body 220 provided rearward of the emergent lens array 210 and configured such that the emergent lens array 210 is fixed to the array body 220. The unit lenses 200***a* may each have a shape that is convex forward. In addition, according to the present disclosure, a rear surface of the array body 220 may be provided to directly face the plurality of light sources 100. Therefore, the light emitted from the light sources 100 may immediately enter the rear surface of the array body 220. For example, the rear surface of the array body 220 may have a planar shape. Meanwhile, the emergent lens array 210 and the array body 220 may be configured as separate components, and the emergent lens array 210 and the array body 220 may be attached to each other. Alternatively, the emergent lens array 210 and the array body 220 may be integrated.

Meanwhile, according to the present disclosure, the plurality of light sources 100 may be arranged in a matrix form, and the plurality of unit lenses 200*a*, which constitute the emergent lens array 210, may also be arranged in a matrix form. In this case, the plurality of light sources and the plurality of unit lenses 200*a* may correspond to one another in a one-to-one manner. Therefore, most of the light emitted from one light source 100 may reach the unit lens 200*a* corresponding to the light source 100. Therefore, the entire light distribution pattern formed by the lamp according to the present disclosure may be formed by collecting light distribution patterns that exit the unit lens 200*a* and are formed independently.

Therefore, the light beams emitted from the plurality of light sources 100 may reach the unit lenses 200*a* corresponding to the plurality of light sources 100, and a center of a local light distribution pattern, which is formed by the light beams that reach some of the plurality of unit lenses 200*a* and then propagate to the outside when some of the plurality of light sources 100 are turned on, may be physically spaced apart from a center of a local light distribution pattern formed by the light beams that reach some of the other unit lenses 200*a* and then propagate to the outside when some of the other light sources 100 are turned on. More particularly, centers of local light distribution patterns, which are formed by the light beams that are emitted from the plurality of light sources 100, reach the unit lenses 200*a* corresponding to the light sources 100 in a one-to-one manner, and then propagate to the outside, may be physically spaced apart from one another.

The operation of turning on or off at least some of the plurality of light sources 100, which constitute the lamp 10 according to the present disclosure, may be independently controlled. For example, the lamp 10 according to the present disclosure may be an intelligent front-lighting system (IFS) lamp that forms a light distribution pattern that varies depending on a state in front of the lamp. In this case, the present disclosure may include the features that may form a uniform light-emitting surface of the lamp, when the lamp is viewed from the outside, even in case that some of the plurality of light sources 100 constituting the lamp are turned on.

More specifically, an overall light distribution pattern, which is formed by the light beams that are emitted from the plurality of light sources 100, reach the micro-lens array part 200, and then propagate to the outside, is defined as an entire light distribution pattern BP. When i) the plurality of light sources 100 and ii) the plurality of local light distribution patterns, which are formed by the light beams that are emitted from the plurality of light sources 100, reach the plurality of unit lenses 200*a*, and then propagate to the outside, are connected by imaginary line segments (hereinafter, referred to as 'imaginary line segments'), at least some of the plurality of imaginary line segments may intersect one another in the leftward/rightward direction or the upward/downward direction. It may be understood that at least some of the light beams emitted from the plurality of light sources 100 arranged in the matrix form propagate to the outside in a state in which the light beams intersect one another, thereby forming the light distribution pattern.

More particularly, a light distribution pattern, which is formed by the light beams that reach some of the plurality of unit lenses 200*a* and then propagate to the outside when some of the plurality of light sources 100 are turned on, is defined as a local light distribution pattern. The light sources 100, which emit the light beams for forming the local light distribution pattern among the plurality of light sources 100, may be disposed to be further dispersed than the local light distribution pattern.

Figure 3:
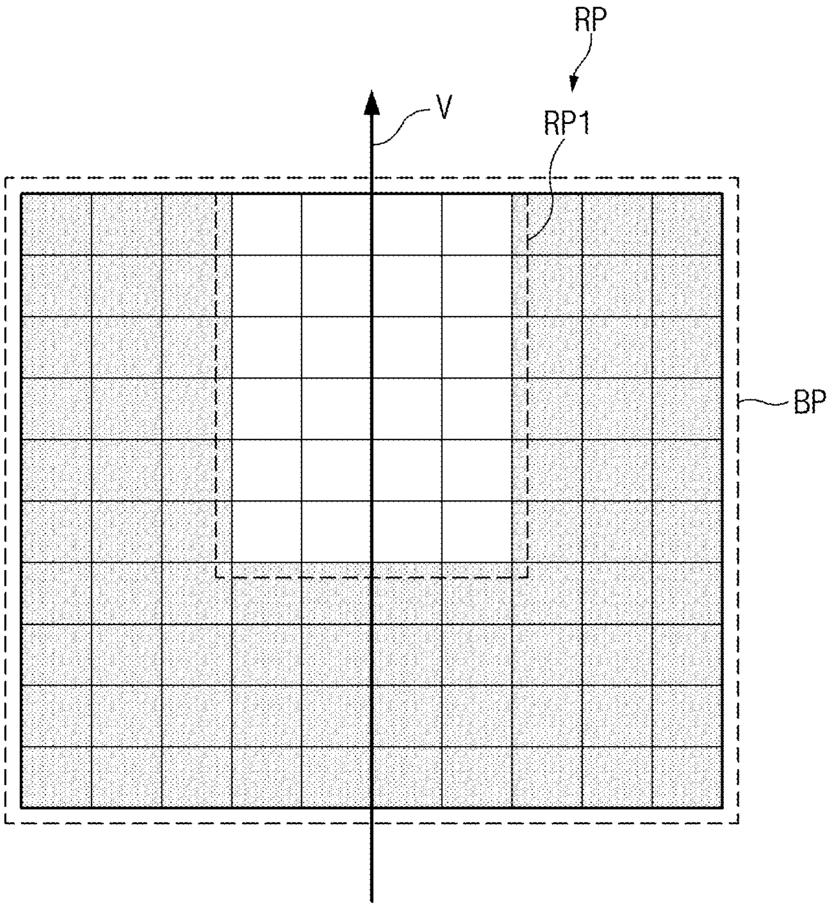
FIG. 3 is a view illustrating an example of a symmetric local light distribution pattern in case that a local light distribution pattern formed by the lamp for a vehicle according to the present disclosure is the symmetric local light distribution pattern.
Figure 4:
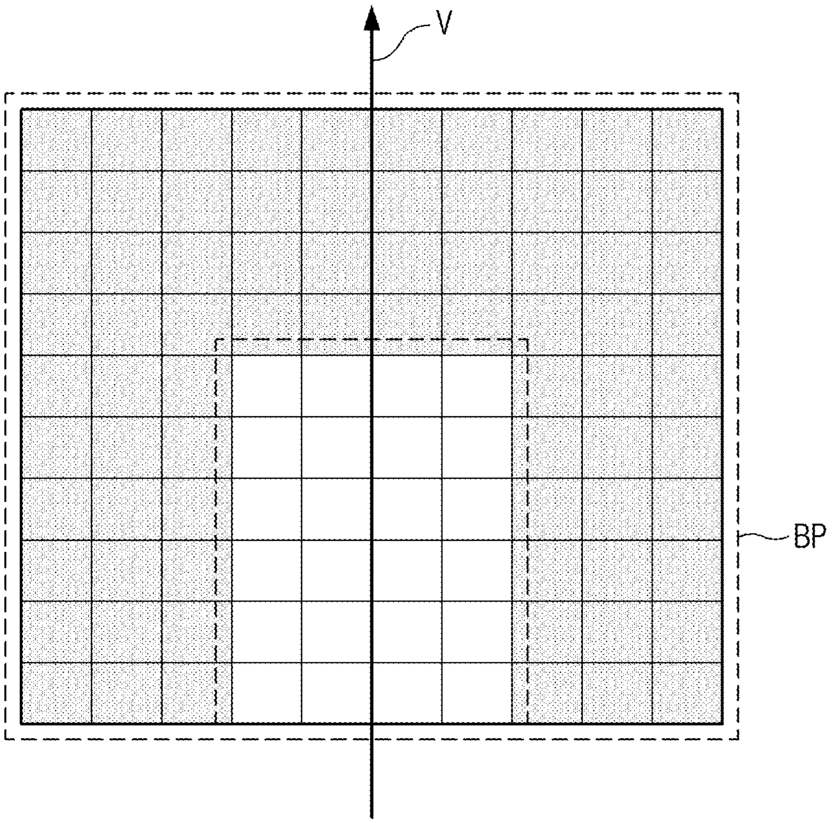
FIG. 4 is a view illustrating a state in which the symmetric local light distribution pattern in FIG. 3 is inverted in an upward/downward direction.
Figure 5:
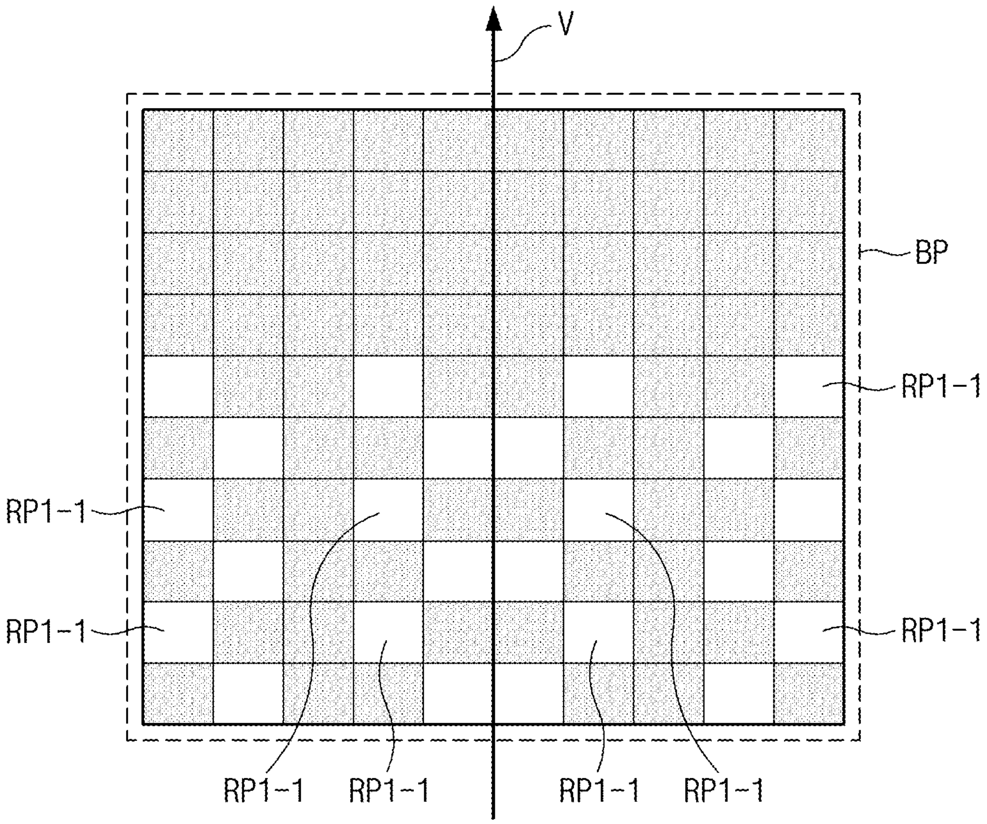
FIG. 5 is a view illustrating an example of a first-first dispersed light distribution pattern formed based on the light distribution pattern in FIG. 4.
Figure 6:
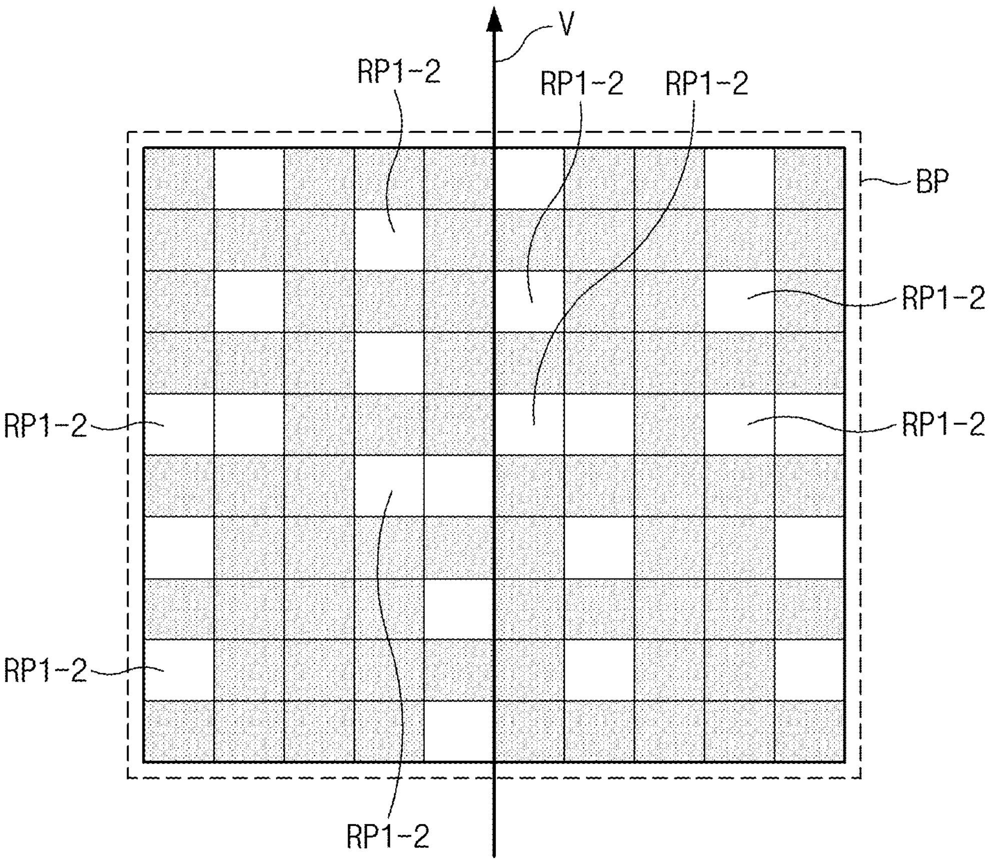
FIG. 6 is a view illustrating an example of a first-second dispersed light distribution pattern formed from the first-first dispersed light distribution pattern in FIG. 5.
Figure 7:
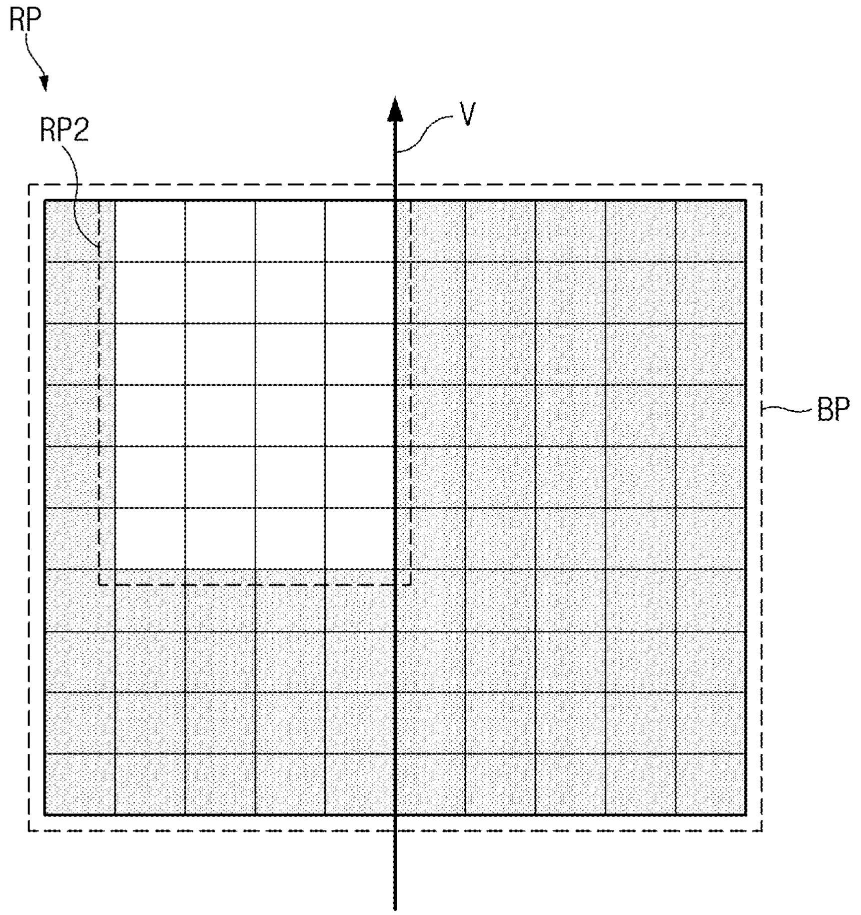
FIG. 7 is a view illustrating an example of an asymmetric local light distribution pattern in case that the local light distribution pattern formed by the lamp for a vehicle according to the present disclosure is the asymmetric local light distribution pattern.
Figure 8:
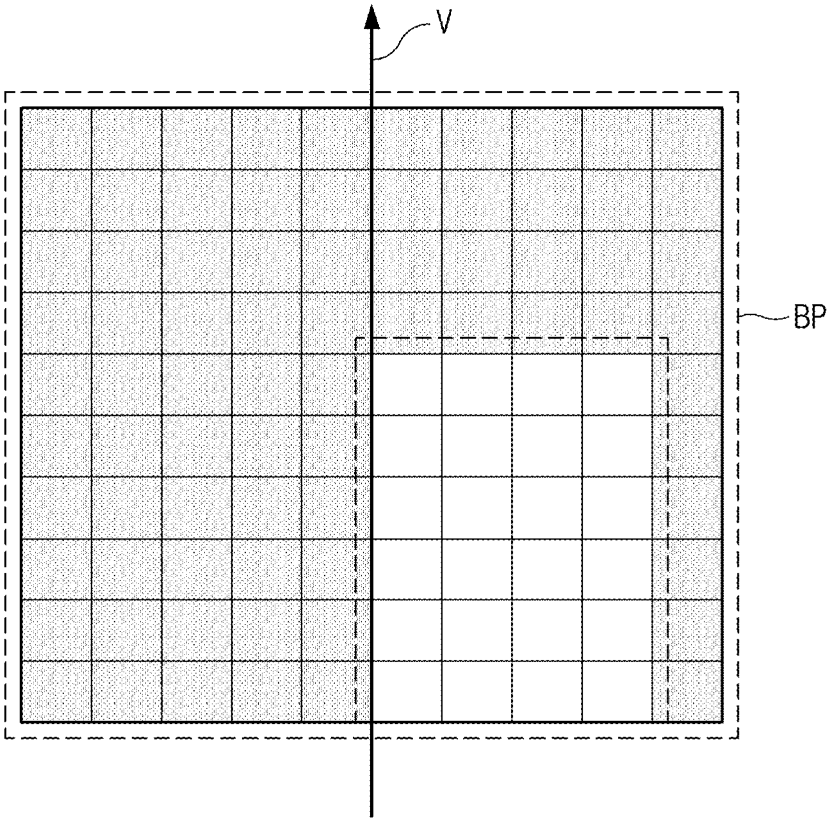
FIG. 8 is a view illustrating a state in which the asymmetric local light distribution pattern in FIG. 6 is inverted in the upward/downward direction and a leftward/rightward direction.
Figure 9:
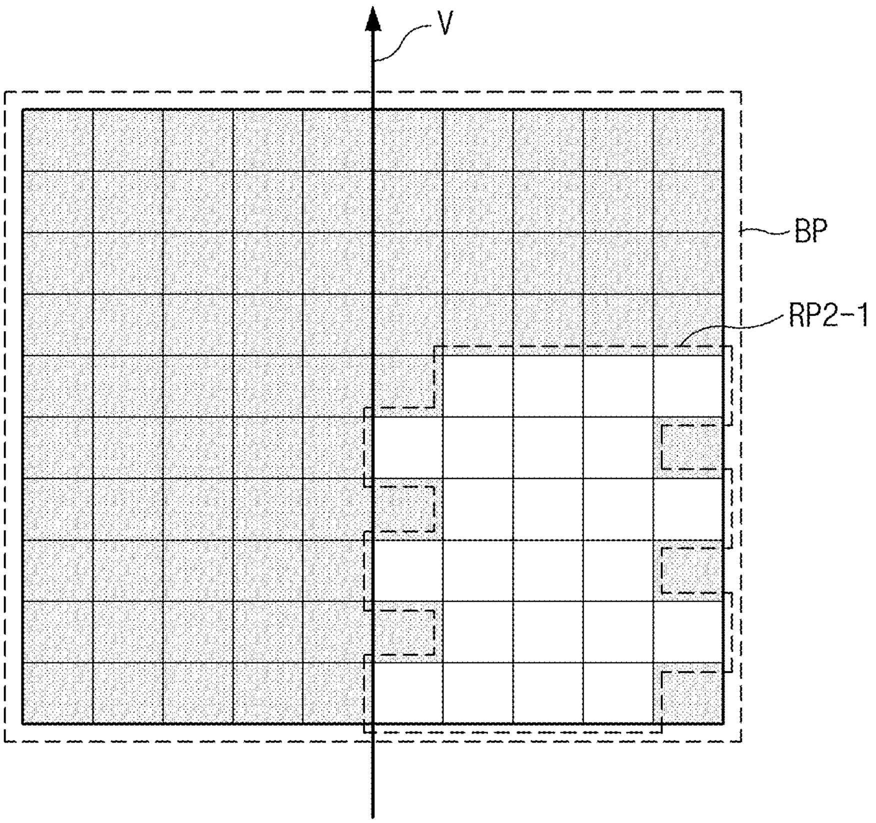
FIG. 9 is a view illustrating an example of a second-first dispersed light distribution pattern formed based on the light distribution pattern in FIG. 8.
Figure 10:
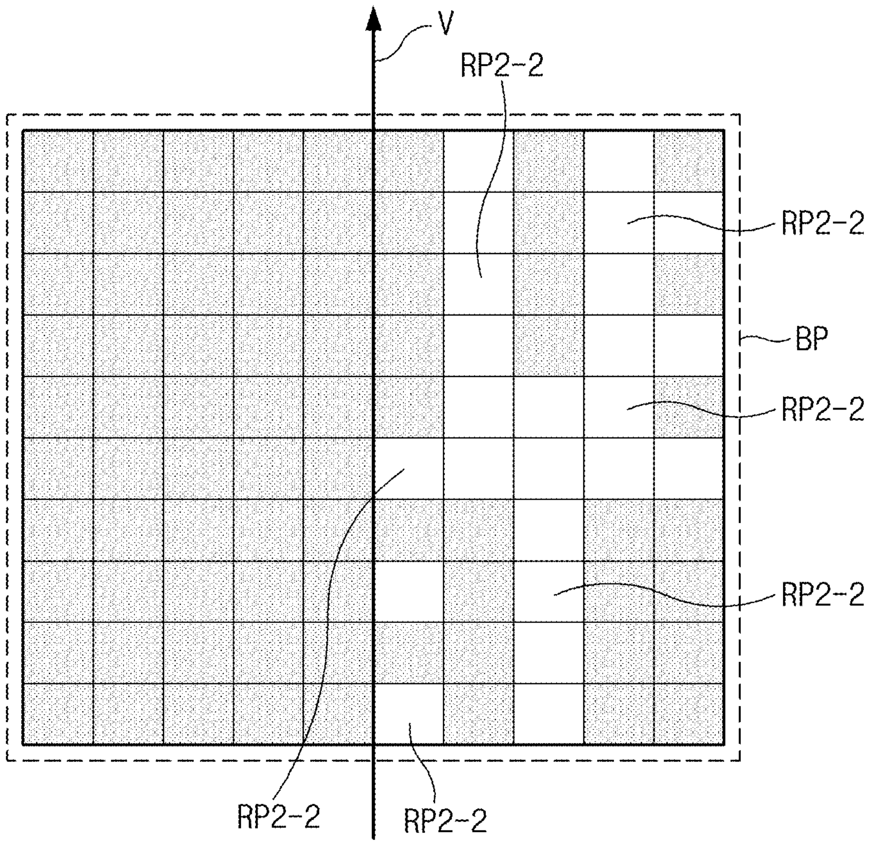
FIG. 10 is a view illustrating an example of a second-second dispersed light distribution pattern formed from the second-first dispersed light distribution pattern in FIG. 9.
Figure 11:
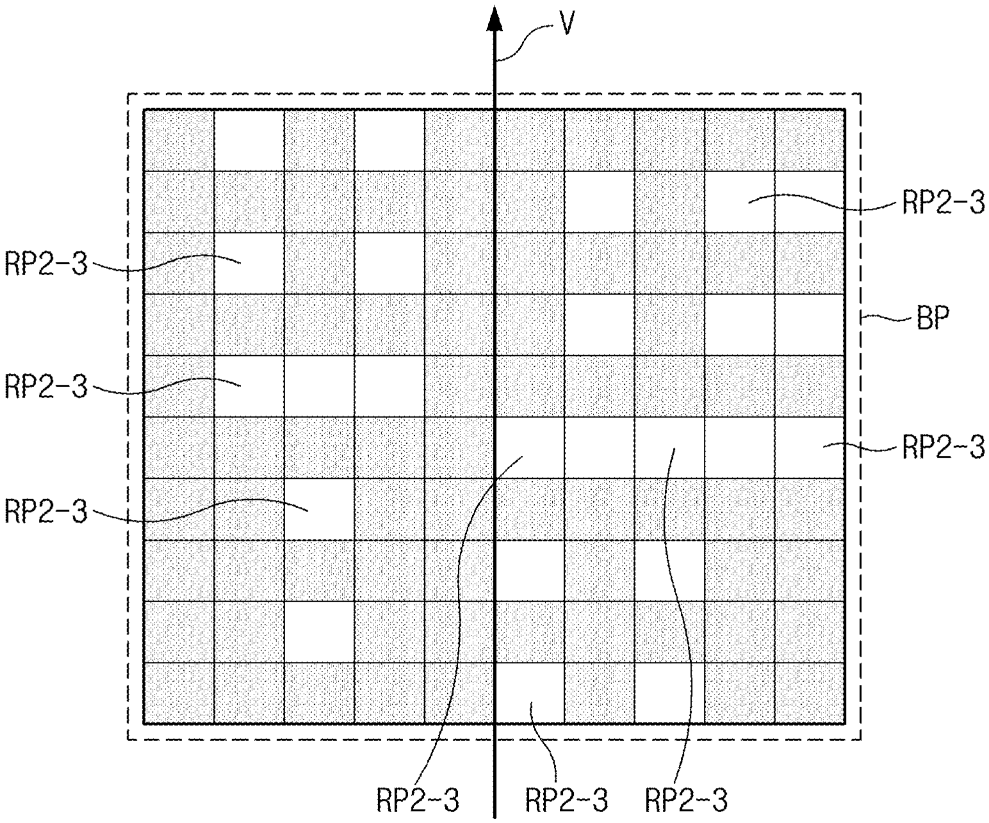
FIG. 11 is a view illustrating an example of a second-third dispersed light distribution pattern formed from the second-second dispersed light distribution pattern in FIG. 10.

FIG. 3 is a view illustrating an example of a symmetric local light distribution pattern in case that a local light distribution pattern formed by the lamp for a vehicle according to the present disclosure is the symmetric local light distribution pattern, and FIG. 4 is a view illustrating a state in which the symmetric local light distribution pattern in FIG. 3 is inverted in the upward/downward direction. FIG. 5 is a view illustrating an example of a first-first dispersed light distribution pattern formed based on the light distribution pattern in FIG. 4, and FIG. 6 is a view illustrating an example of a first-second dispersed light distribution pattern formed from the first-first dispersed light distribution pattern in FIG. 5. FIG. 7 is a view illustrating an example of an asymmetric local light distribution pattern in case that the local light distribution pattern formed by the lamp for a vehicle according to the present disclosure is the asymmetric local light distribution pattern, and FIG. 8 is a view illustrating a state in which the asymmetric local light distribution pattern in FIG. 6 is inverted in the upward/downward direction and the leftward/rightward direction. FIG. 9 is a view illustrating an example of a second-first dispersed light distribution pattern formed based on the light distribution pattern in FIG. 8, and FIG. 10 is a view illustrating an example of a second-second dispersed light distribution pattern formed from the second-first dispersed light distribution pattern in FIG. 9. FIG. 11 is a view illustrating an example of a second-third dispersed light distribution pattern formed from the second-second dispersed light distribution pattern in FIG. 10.

With reference to FIGS. 3 to 6, when a local light distribution pattern RP has a matrix form, some of the turned-on light sources, which are turned on to form the local light distribution pattern RP among the plurality of light sources 100, may be spaced apart from some of the other turned-on light sources in the upward/downward direction and the leftward/rightward direction.

More specifically, the entire light distribution pattern BP and the plurality of light sources 100 may be arranged in a matrix form of m×n (here, m represents the number of rows, and n represents the number of columns). The light sources 100, which form a local light distribution pattern RP1 (hereinafter, referred to as a 'symmetric local light distribution pattern') having a symmetric shape with respect to a central axis V of the entire light distribution pattern BP based on the upward/downward direction in the plurality of light sources 100, may be arranged depending on the following rule.

i) an up-and-down inversion step (see FIG. 4) of forming an inverted local light distribution pattern by inverting the symmetric local light distribution pattern RP1 in the upward/downward direction, ii) a left-and-right dispersion step (see FIG. 5) of forming a first-first dispersed light distribution pattern RP1-1 by fixing some unit lattices, which constitute the inverted local light distribution pattern inverted in the up-and-down inversion step, and moving some of the other unit lattices in the leftward/rightward direction, iii) an up-and-down dispersion step (see FIG. 6) of forming a first-second dispersed light distribution pattern RP1-2 by fixing some of the columns of the first-first dispersed light distribution pattern RP1-1 and inverting some of the other columns in the upward/downward direction, and iv) a light source disposition step of disposing the light sources 100, which form the symmetric local light distribution pattern RP1, at a position corresponding to the first-second dispersed light distribution pattern RP1-2.

It may be understood that the symmetric local light distribution pattern RP1 is formed when the light sources 100, which are provided at the position corresponding to the first-second dispersed light distribution pattern RP1-2 among the plurality of light sources 100 of the lamp 10 according to the present disclosure, are turned on.

For example, in the above-mentioned left-and-right dispersion step, the unit lattices, which are adjacent, in the upward/downward direction or the leftward/rightward direction, to the fixed unit lattices among the unit lattices constituting the inverted local light distribution pattern inverted in the up-and-down inversion step, may move in the leftward/rightward direction. In addition, in the left-and-right dispersion step, some of the other unit lattices, which constitute the inverted local light distribution pattern inverted in the up-and-down inversion step, may move in a direction opposite to the direction toward the central axis V based on the upward/downward direction, i.e., move in an outward direction away from the central axis V.

In addition, with reference to FIGS. 7 to 11, the entire light distribution pattern BP and the plurality of light sources 100 may be arranged in a matrix form of m×n (here, m represents the number of rows, and n represents the number of columns). The light sources 100, which form a local light distribution pattern RP2 (hereinafter, referred to as an 'asymmetric local light distribution pattern') having an asymmetric shape with respect to the central axis V of the entire light distribution pattern BP based on the upward/downward direction in the plurality of light sources 100, may be arranged depending on the following rule.

i) an up-and-down and left-and-right inversion step (see FIG. 7) of forming an inverted local light distribution pattern by inverting the asymmetric local light distribution pattern RP2 in the upward/downward direction and the leftward/rightward direction, ii) a left-and-right dispersion step (see FIG. 8) of forming a second-first dispersed light distribution pattern RP2-1 by fixing some unit lattices, which constitute the inverted local light distribution pattern inverted in the up-and-down and left-and-right inversion step, and moving some of the other unit lattices in the leftward/rightward direction, iii) an up-and-down dispersion step (see FIG. 9) of forming a second-second dispersed light distribution pattern RP2-2 by fixing some of the columns of the second-first dispersed light distribution pattern RP2-1 and inverting some of the other columns in the upward/downward direction, iv) a step (see FIG. 10) of forming a second-third dispersed light distribution pattern RP2-3 by fixing some unit lattices, which constitute the second-second dispersed light distribution pattern RP2-2, and moving some of the other unit lattices in the leftward/rightward direction while traversing the central axis V based on the upward/downward direction, and v) a light source disposition step of disposing the light sources 100, which form the asymmetric local light distribution pattern RP2, at a position corresponding to the second-third dispersed light distribution pattern RP2-3.

It may be understood that the asymmetric local light distribution pattern RP2 is formed when the light sources 100, which are provided at the position corresponding to the second-third dispersed light distribution pattern RP2-3 among the plurality of light sources 100 of the lamp 10 according to the present disclosure, are turned on.

For example, in the above-mentioned left-and-right dispersion step, some of the other unit lattices, which constitute the inverted local light distribution pattern inverted in the up-and-down inversion step, may move in the direction opposite to the direction toward the central axis V based on the upward/downward direction, i.e., move in the outward direction away from the central axis V.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

What is claimed is:

1. A lamp for a vehicle, the lamp comprising:
- a plurality of light sources; and
- a micro-lens array part comprising a plurality of unit lenses provided forward of the plurality of light sources and having a concave-convex shape,
- wherein the micro-lens array part comprises:
  - an emergent lens array configured to define an emergent surface of the micro-lens array part and comprising the plurality of unit lenses; and
  - an array body provided rearward of the emergent lens array, wherein the emergent lens array is configured to be fixed to the array body,
  - wherein a rear surface of the array body is provided to directly face the plurality of light sources,
- wherein a light distribution pattern, formed by a first light source corresponding to some of the light sources, is modified through multiple inversion and dispersion until a dispersed light distribution pattern across the entire lamp is formed, and
- wherein the dispersed light distribution pattern forms a uniform light-emitting surface of the lamp when viewed externally.

2. The lamp of claim 1, wherein the rear surface of the array body has a planar shape.

3. The lamp of claim 1, wherein the emergent lens array and the array body are configured as separate components.

4. The lamp of claim 1, wherein the emergent lens array and the array body are integrated.

5. The lamp of claim 1, wherein light beams emitted from the plurality of light sources reach the unit lenses corresponding to the plurality of light sources, and
- wherein a center of a local light distribution pattern, which is formed by light beams that reach some of the plurality of unit lenses and then propagate to the outside when some of the plurality of light sources are turned on, is physically spaced apart from a center of a local light distribution pattern formed by light beams that reach some of the other unit lenses and then propagate to the outside when some of the other light sources are turned on.

6. The lamp of claim 1, wherein the plurality of light sources and the plurality of unit lenses correspond to one another in a one-to-one manner, and wherein centers of local light distribution patterns, which are formed by light beams that are emitted from the plurality of light sources, reach the unit lenses corresponding to the light sources in a one-to-one manner, and then propagate to the outside, are physically spaced apart from one another.

7. The lamp of claim 1, wherein an overall light distribution pattern, which is formed by light beams that are emitted from the plurality of light sources, reach the microlens array part, and then propagate to the outside, is defined as an entire light distribution pattern, and wherein when the plurality of light sources and the plurality of local light distribution patterns, which are formed by the light beams that are emitted from the plurality of light sources, reach the plurality of unit lenses, and then propagate to the outside, are connected by imaginary line segments, at least some of the plurality of imaginary line segments intersect one another in a leftward/rightward direction or an upward/downward direction.

8. The lamp of claim 7, wherein the light distribution pattern, which is formed by light beams that reach some of the plurality of unit lenses and then propagate to the outside when some of the plurality of light sources are turned on, is defined as a local light distribution pattern, and the light sources, which emit the light beams for forming the local light distribution pattern among the plurality of light sources, are disposed to be further dispersed than the local light distribution pattern.

9. The lamp of claim 7, wherein the light distribution pattern, which is formed by light beams that reach some of the plurality of unit lenses and then propagate to the outside when some of the plurality of light sources are turned on, is defined as a local light distribution pattern, wherein the local light distribution pattern has a matrix form, and wherein some turned-on light sources, which are turned on to form the local light distribution pattern among the plurality of light sources, are spaced apart from some of the other turned-on light sources in the upward/downward direction and the leftward/rightward direction.

10. The lamp of claim 9, wherein the entire light distribution pattern and the plurality of light sources are arranged in a matrix form of m×n, wherein m represents the number of rows and n represents the number of columns, and wherein the light sources, which form the local light distribution pattern as a symmetric local light distribution pattern having a symmetric shape with respect to a central axis V of the entire light distribution pattern based on the upward/downward direction in the plurality of light sources, are configured to:

form an up-and-down inversion by forming an inverted local light distribution pattern by inverting the symmetric local light distribution pattern in the upward/downward direction;

form a left-and-right dispersion by forming a first-first dispersed light distribution pattern by fixing some unit lattices, which constitute the inverted local light distribution pattern inverted in the up-and-down inversion, and moving some of the other unit lattices in the leftward/rightward direction;

form an up-and-down dispersion by forming a first-second dispersed light distribution pattern by fixing some of the columns of the first-first dispersed light distribution pattern and inverting some of the other columns in the upward/downward direction; and form a light source disposition by disposing the light sources, which form the symmetric local light distribution pattern, at a position corresponding to the first-second dispersed light distribution pattern.

11. The lamp of claim 10, wherein in the left-and-right dispersion, the unit lattices, which are adjacent, in the upward/downward direction or the leftward/rightward direction, to the fixed unit lattices among the unit lattices constituting the inverted local light distribution pattern inverted in the up-and-down inversion, move in the leftward/rightward direction.

12. The lamp of claim 10, wherein in the left-and-right dispersion, some of the other unit lattices, which constitute the inverted local light distribution pattern inverted in the up-and-down inversion, move in a direction opposite to a direction toward the central axis V based on the upward/downward direction.

13. The lamp of claim 9, wherein the entire light distribution pattern and the plurality of light sources are arranged in a matrix form of m×n, wherein m represents the number of rows and n represents the number of columns, and wherein the light sources, which form the local light distribution pattern as an asymmetric local light distribution pattern having an asymmetric shape with respect to a central axis V of the entire light distribution pattern based on the upward/downward direction in the plurality of light sources, are configured to:

form an up-and-down and left-and-right inversion by forming an inverted local light distribution pattern by inverting the asymmetric local light distribution pattern in the upward/downward direction and the leftward/rightward direction;

form a left-and-right dispersion by forming a second-first dispersed light distribution pattern by fixing some unit lattices, which constitute the inverted local light distribution pattern inverted in the up-and-down and left-and-right inversion, and moving some of the other unit lattices in the leftward/rightward direction;

form an up-and-down dispersion by forming a second-second dispersed light distribution pattern by fixing some of the columns of the second-first dispersed light distribution pattern and inverting some of the other columns in the upward/downward direction;

form a second-third dispersed light distribution pattern by fixing some unit lattices, which constitute the second-second dispersed light distribution pattern, and moving some of the other unit lattices in the leftward/rightward direction while traversing the central axis V based on the upward/downward direction; and form a light source disposition by disposing the light sources, which form the asymmetric local light distribution pattern, at a position corresponding to the second-third dispersed light distribution pattern.

14. The lamp of claim 13, wherein in the left-and-right dispersion, step, some of the other unit lattices, which constitute the inverted local light distribution pattern inverted in the up-and-down inversion, step, move in a direction opposite to a direction toward the central axis V based on the upward/downward direction.

* * * * *